United States Patent [19]

Kiyooka et al.

[11] 4,008,911
[45] Feb. 22, 1977

[54] JOINT ASSEMBLY FOR PLASTIC TUBES

[75] Inventors: Yoshiharu Kiyooka; Ginji Kaneko, both of Okazaki, Japan

[73] Assignee: Maruyasu Kogyo Kabushiki Kaisha, Nagoya, Japan

[22] Filed: Oct. 30, 1975

[21] Appl. No.: 627,265

[30] Foreign Application Priority Data

Nov. 14, 1974 Japan .............................. 49-138031

[52] U.S. Cl. .............................. 285/249; 285/348; 285/382.7
[51] Int. Cl.² ......................................... F16L 33/20
[58] Field of Search ............... 285/249, 382.7, 341, 285/342, 348, 248, 250

[56] References Cited

UNITED STATES PATENTS

| 2,761,704 | 9/1956 | Crawford | 285/249 X |
| 3,336,061 | 8/1967 | Heisler | 285/348 X |

FOREIGN PATENTS OR APPLICATIONS

| 52,948 | 7/1944 | France | 285/342 |
| 729,401 | 4/1932 | France | 285/341 |
| 673,839 | 11/1964 | Italy | 285/348 |
| 203,347 | 7/1939 | Switzerland | 285/342 |
| 1,146,673 | 3/1969 | United Kingdom | 285/341 |
| 647,999 | 12/1950 | United Kingdom | 285/341 |
| 1,233,372 | 5/1971 | United Kingdom | 285/382.7 |

*Primary Examiner*—Thomas F. Callaghan
*Attorney, Agent, or Firm*—Birch, Stewart, Kolasch and Birch

[57] ABSTRACT

A joint assembly for plastic tubes including an annular caulking element having a substantially triangular cross section, opposite annular ends thereof being adapted to be caulked into the outer peripheral surface of a plastic tube to be connected by the wedging action applied by a fastening structure, said caulking element being composed of two annular members arranged to be axially compressible toward each other while defining an annular groove therebetween, and an annular elastic sealing member being disposed in said groove and being adapted to be bulged out, radially inwardly to be pressed against the outer surface of said plastic tube under said axial compression of said two annular members.

3 Claims, 2 Drawing Figures

JOINT ASSEMBLY FOR PLASTIC TUBES

BACKGROUND OF THE INVENTION

1. Field of the Invention

The present invention relates to a joint assembly for plastic tubes.

2. Description of the Prior Art

With regard to a joint for plastic tubes, a great difficulty is encountered because the plastic tube is soft and has no ability to support the fastening force and, in addition, the deformation which is easily effected by a relatively small force is mostly plastic thereby excluding any expectation for the elastic packing function by the tube itself. Furthermore, since the softness and the plasticity of plastic tubes are increased as the temperature thereof becomes higher, a greater difficulty is encountered in the joint for plastic tubes used with a high temperature fluid or in a high temperature atmosphere.

Conventionally, a joint assembly which is commonly used for plastic tubes comprises a sleeve to be inserted into an end portion of a plastic tube for supporting the inner peripheral surface of said end portion, an annular caulking element having a substantially triangular cross section as a whole and adapted to be mounted around said end portion, the body member having an annular seat for receiving a tapered outer peripheral surface of said annular caulking element, and a cap nut having an annular seat for receiving another tapered outer surface of said annular caulking element and adapted to be screwed onto said body member. In this conventional joint assembly, wherein said sleeve is formed either as a unitary portion of the body member to project from an end portion thereof or as an independent element because it is relatively difficult to form the unitary sleeve with a body member, as the cap nut is screwed onto the body member, opposite end portions of said tapered outer peripheral surfaces of said annular caulking element are urged gradually inwardly due to engagement with said annular seat of the body member so that said opposite end portions cut into the outer peripheral surface of the plastic tube supported by said sleeve at its inner peripheral surface thereby establishing a gas-tight connection for the terminal of the plastic tube. In this conventional joint assembly, however, although a relatively good gas-tight connection is obtained in an early period of fastening by the opposite end portions of the annular caulking element being elastically caulked into the outer peripheral surface of a plastic tube, the plastic tube soon experiences plastic deformation at its pressed portion. This deformation is especially rapid when the tube is subjected to a relatively high temperature, whereby the contact pressure at the caulked portion gradually lowers thereby increasing the danger that leakage occurs at the contacting portion. The leakage due to the plastic deformation at the fastened contacting portion becomes remarkable when the plastic tube is used with a hot fluid or in a hot atmosphere to such an extent that the conventional joint assembly of this type is almost inapplicable for high temperature services.

SUMMARY OF THE INVENTION

Therefore, it is the object of the present invention to solve the abovementioned problems in the conventional joint assembly for plastic tubes and to provide an improved joint assembly for plastic tubes which can maintain a good gas-tightness for a long period of service by utilizing a relatively simple structure.

Other objects and further scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

According to the present invention, the above-mentioned object is accomplished by a joint assembly for plastic tubes comprising a sleeve to be inserted into an end portion of a plastic tube for supporting the inner peripheral surface of said end portion, an annular caulking element having a substantially triangular cross section as a whole and adapted to be mounted around said end portion, a body member having an annular seat for receiving a tapered outer peripheral surface of said annular caulking element, and a cap nut having an annular seat for receiving another tapered outer surface of said annular caulking element and adapted to be screwed onto said body member, wherein said annular caulking element is composed of two annular members, each one being provided with one of said tapered outer peripheral surfaces, said annular members defining an annular groove therebetween, and an annular elastic sealing element disposed in said groove, said two annular members being compressible toward each other to reduce the width of said groove to be smaller than the width of said annular sealing element.

By the abovementioned arrangement wherein the annular caulking element is composed of two annular members, each one being provided with one of said tapered outer peripheral surfaces and said annular members defining an annular groove and an annular elastic sealing element being disposed in said groove, and that said two annular members are compressible toward each other to reduce the width of said groove to be smaller than the width of said annular sealing element, when the cap nut is screwed onto the body member with said annular seat of said body member and said cap nut being engaged onto said tapered outer peripheral surfaces of said annular caulking element in a wedging manner, the opposite end portions of said caulking element are caulked into the outer peripheral surface of the plastic tube and, simultaneously, the annular elastic sealing element is actually compressed in said groove between said two annular members whereby it bulges out radially inwardly to abut elastically against the outer peripheral surface of the plastic tube thereby accomplishing a good gas-tight contact therebetween. The compression force applied to the outer peripheral surface of the plastic tube by the annular elastic sealing element is relatively small when compared with the compression force applied by the opposite end portions of the caulking element and is of such a strength that it does not cause any plastic deformation of the plastic tube. In spite of this relatively small compressive force, however, since the elastic sealing element is elastically pressed onto the peripheral surface of the plastic tube, a good and stable gas-tightness is maintained at the contacting area over a long period of operation even under a relatively high temperature condition. Due to this gas-tight contact by the annular elastic sealing element, the joint assembly according to the present invention can maintain a good gas-tightness even when the plastic tube undergoes plastic deformation at the portions contacting the opposite end portions of the annular caulking element.

BRIEF DESCRIPTION OF THE DRAWING

The present invention will become more fully understood from the detailed description given hereinbelow and the accompanying drawings which are given by way of illustration only, and thus are not limitative of the present invention, and wherein.

DESCRIPTION OF THE PREFERRED EMBODIMENT

Figure 1:
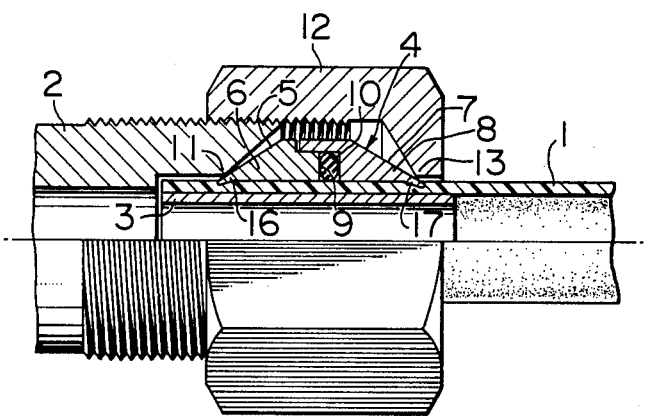
FIG. 1 is a view partially in section and partly in side view of an embodiment of the joint assembly for plastic tubes according to the present invention; and, FIG. 2 is a view partially in section and partly in side view of the annular caulking element included in the joint assembly shown in FIG. 1, wherein the annular caulking element is shown in its loosened condition.

Referring to FIG. 1, element 1 designates the plastic tube, the end of which is to be connected to a joint assembly having a body member 2. A sleeve 3 is inserted into an end portion of the plastic tube 1 to fittingly engage and support the inner peripheral surface of the tube. An annular caulking element 4 having a triangular cross section as a whole is mounted on said end portion of the tube to cover the peripheral outer surface of the portion which is backed-up by the sleeve 3. The annular caulking element is composed of annular members 6 and 8 having tapered outer surfaces 5 and 7, respectively, and an annular elastic sealing element like an O-ring 10 disposed in an annular groove 9 disposed between said two annular members. The tapered outer surface 5 of the annular member 6 is adapted to engage an annular seat 11 formed in the body member 2, while the tapered outer surface 7 of the other annular member 8 is adapted to engage an annular seat 13 formed in the cap nut 12 which is adapted to be screwed onto the body member 2.

Figure 2:
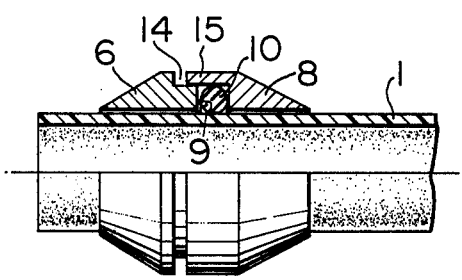

FIG. 2 shows the annular caulking element 4 mounted around the plastic tube 1, wherein the two annular members 6 and 8 of the caulking element are not yet actually compressed toward each other and, therefore, the annular elastic sealing element 10 is not yet actually compressed. As shown in the figure, the annular member 6 is formed with an annular shouldered portion 14 adjacent its end which defines the annular groove 9 while, on the other hand, the other annular member 8 is formed with a sleeve portion 15 projecting from its end which defines the annular groove 9. By properly determining the axial dimensions of the annular shouldered portion and the sleeve portion, the width of the annular groove 9 can be reduced to be smaller than the width of the annular elastic sealing element 10 when the annular members 6 and 8 are axially compressed toward each other and, furthermore, the minimum width of the annular groove 9 under the compressed condition can be positively maintained for avoiding over compression of the annular sealing element, if desired.

Referring again to FIG. 1, in the shown condition the cap nut 12 is screwed onto the body member 2 with a predetermined fastening force thereby accomplishing a gas-tight connection for the terminal of the plastic tube 1. Under this condition, the annular seat 11 of the body member 2 is somewhat driven onto the tapered outer peripheral surface 5 of the annular member 6 thereby driving in turn an end portion 16 of the annular member 6 somewhat radially inwardly to caulk the end portion into the outer peripheral surface of the plastic tube 1. Similarly, the annular seat 13 of the cap nut 12 is somewhat driven onto the tapered outer peripheral surface 7 of the annular member 8 thereby driving in turn an end portion 17 of the annular member somewhat radially inwardly to caulk the end portion into the outer peripheral surface of the plastic tube 1. Simultaneously with this caulking action, due to the axial compression of the annular members 6 and 8 toward each other, the annular elastic sealing member 10 is somewhat axially compressed in said annular groove 9, whereby the inner peripheral portion is bulged radially inwardly to be elastically pressed against the outer peripheral surface of the plastic tube 1. In the condition shown in FIG. 1, a small clearance is still left between the end wall portion of the annular shoulder portion 14 and the end wall portion of the sleeve portion 15 thereby allowing for a clearance for a further compression of the annular elastic element 10.

From the foregoing, it will be apparent that even when the deformation caused to the plastic tube 1 by said small deformation of said opposite end portions 16 and 17 of the annular caulking element 4 has been converted to plastic deformation thereby lowering the contact pressure between the plastic tube and the annular caulking element thus resulting in a loss of gas-tightness at the contacting portions, the gas-tightness between the annular caulking element 4 and the plastic tube 1 is still maintained by the annular elastic sealing element 10 thereby ensuring the gas-tightness of the joint assembly for a long period of operation.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim:

1. A joint assembly for plastic tubes comprising a sleeve inserted into an end portion of a plastic tube for supporting the inner peripheral surface of said end portion, an annular caulking element having a substantially triangular cross section as a whole and composed of two annular members, each having a tapered outer surface, said annular caulking members being adapted to be mounted around said end portion, a body member having an annular seal for receiving a tapered outer peripheral surface of one of said annular members, and a cap nut having an annular seal for receiving the tapered outer surface of another of said annular members and adapted to be screwed onto said body member, said annular members cooperating with each other to define an annular groove of substantially rectangular cross section and an annular elastic sealing element of substantially circular cross section disposed in said groove, said two annular members being engagable with each other for reducing the width of said groove to a size smaller than the normal width of said annular elastic sealing element, the height of said annular groove being substantially the same as the normal height of said annular elastic sealing element.

2. The joint assembly of claim 1, wherein one of said annular members is formed with an annular shoulder portion at the one end thereof which defines said groove while the other of said annular members is formed with a sleeve portion projecting from the end portion thereof which defines said annular groove, said shouldered portion engaging with said sleeve portion in a manner for guiding relative axial movement of said two annular members while at the same time limiting the axial movement of said two annular members toward each other beyond a predetermined amount.

3. The joint assembly of claim 2, wherein said annular sealing element is bulged out radially inwardly by an amount sufficient to accomplish a required gas-tight contact between said annular sealing element and said plastic tube due to axial compression applied by said two annular members substantially before the axial compression of said two annular members is limited by said engagement between said shouldered portion and said sleeve portion.

* * * * *